United States Patent
Wang et al.

(10) Patent No.: US 10,063,128 B2
(45) Date of Patent: Aug. 28, 2018

(54) LINEAR VIBRATOR

(71) Applicants: Hongxing Wang, Shenzhen (CN); Fei Hou, Shenzhen (CN); Lubin Mao, Shenzhen (CN); Shun Guo, Shenzhen (CN)

(72) Inventors: Hongxing Wang, Shenzhen (CN); Fei Hou, Shenzhen (CN); Lubin Mao, Shenzhen (CN); Shun Guo, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 352 days.

(21) Appl. No.: 14/984,240

(22) Filed: Dec. 30, 2015

(65) Prior Publication Data

US 2016/0226365 A1  Aug. 4, 2016

(30) Foreign Application Priority Data

Jan. 29, 2015  (CN) .................... 2015 2 0065695 U

(51) Int. Cl.
*H02K 33/16* (2006.01)

(52) U.S. Cl.
CPC .................... *H02K 33/16* (2013.01)

(58) Field of Classification Search
CPC .................................................... H02K 33/00
USPC ............................... 310/12.01–12.33, 36–37
See application file for complete search history.

(56) References Cited

U.S. PATENT DOCUMENTS

| | | | | |
|---|---|---|---|---|
| 5,808,381 A * | 9/1998 | Aoyama | ................ | H02K 41/03 310/12.22 |
| 7,276,820 B2 * | 10/2007 | Tang | ................ | H02K 1/34 310/12.02 |
| 7,449,803 B2 * | 11/2008 | Sahyoun | ................ | H02K 33/16 310/14 |
| 7,501,724 B2 * | 3/2009 | Tang | ................ | H02K 1/34 310/12.19 |
| 8,013,480 B2 * | 9/2011 | Bang | ................ | H02K 5/225 310/12.25 |
| 8,456,042 B2 * | 6/2013 | Dong | ................ | H02K 33/16 310/15 |
| 8,569,916 B2 * | 10/2013 | Sugita | ................ | H02K 41/031 310/12.15 |
| 8,624,450 B2 * | 1/2014 | Dong | ................ | H02K 33/16 310/15 |
| 8,648,502 B2 * | 2/2014 | Park | ................ | H02K 33/16 310/15 |
| 8,878,401 B2 * | 11/2014 | Lee | ................ | H02K 33/16 310/15 |
| 9,048,718 B2 * | 6/2015 | Zhang | ................ | H02K 33/02 |
| 9,306,429 B2 * | 4/2016 | Akanuma | ................ | H02K 5/24 |
| 9,312,744 B2 * | 4/2016 | Akanuma | ................ | H02K 33/00 |

(Continued)

*Primary Examiner* — Alexander Talpalatski
(74) *Attorney, Agent, or Firm* — Na Xu; IPro, PLLC

(57) ABSTRACT

The present disclosure relates to a linear vibrator including a bottom plate, a voice coil fixed on the bottom plate, a mass block which has a receiving space and located above the voice coil, a magnet array in the receiving space, the magnet array including odd number of longitudinally magnetized first magnets and even number of transversely magnetized second magnets, the first magnets and the second magnets being arranged alternately in a row, and the adjacent first magnets in opposite magnetization direction and the adjacent second magnets in opposite magnetization direction.

7 Claims, 3 Drawing Sheets

(56) References Cited

U.S. PATENT DOCUMENTS

| | | | |
|---|---|---|---|
| 9,590,463 B2* | 3/2017 | Kuroda | H02K 33/00 |
| 9,837,883 B2* | 12/2017 | Jang | H02K 33/00 |
| 2011/0018365 A1* | 1/2011 | Kim | B06B 1/045 |
| | | | 310/17 |
| 2011/0101796 A1* | 5/2011 | Odajima | H02K 33/16 |
| | | | 310/25 |
| 2012/0169151 A1* | 7/2012 | Dong | H02K 33/16 |
| | | | 310/25 |
| 2013/0076178 A1* | 3/2013 | Kuroda | H02K 33/00 |
| | | | 310/81 |
| 2014/0077628 A1* | 3/2014 | Yamada | H02K 33/16 |
| | | | 310/12.16 |

* cited by examiner

LINEAR VIBRATOR

FIELD OF THE INVENTION

The present invention relates to the field of vibrators, particularly to a linear vibrator for a mobile terminal device.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

For a linear vibrator vibrating along a longitudinal direction, it usually includes three magnets, soft magnetic material and two voice coils to form magnetic circuit. Three magnets are arranged side by side and the magnetic induction intensity at the end of the magnets is same. The magnetic field lines close to the voice coil pass through the voice coil so that the voice coil is driven by Lorentz force while electrified. The magnetic lines at the side far away the voice coil are concentrated on the soft magnetic material connected to the magnets to form magnetic circuit. However, because only the magnetic field lines at one side of the magnet pass through the voice coil, the utilization ratio of the magnetic field by the voice coil is not maximized.

Therefore, it is necessary to make improvement on the structure of the linear vibrator to increase the utilization ratio of the magnetic field by the voice coil.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
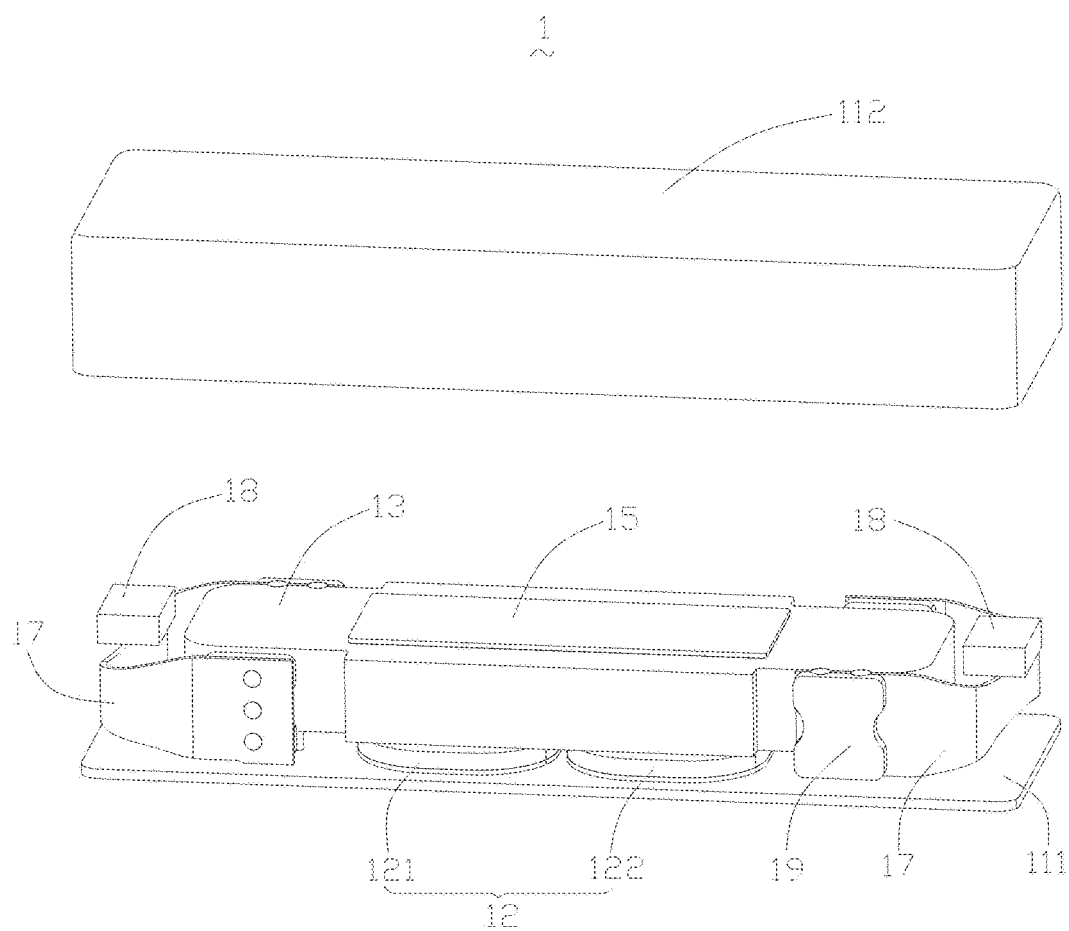
FIG. 1 is an isometric view of a linear vibrator in accordance with an exemplary embodiment disclosed by the present disclosure.
Figure 2:
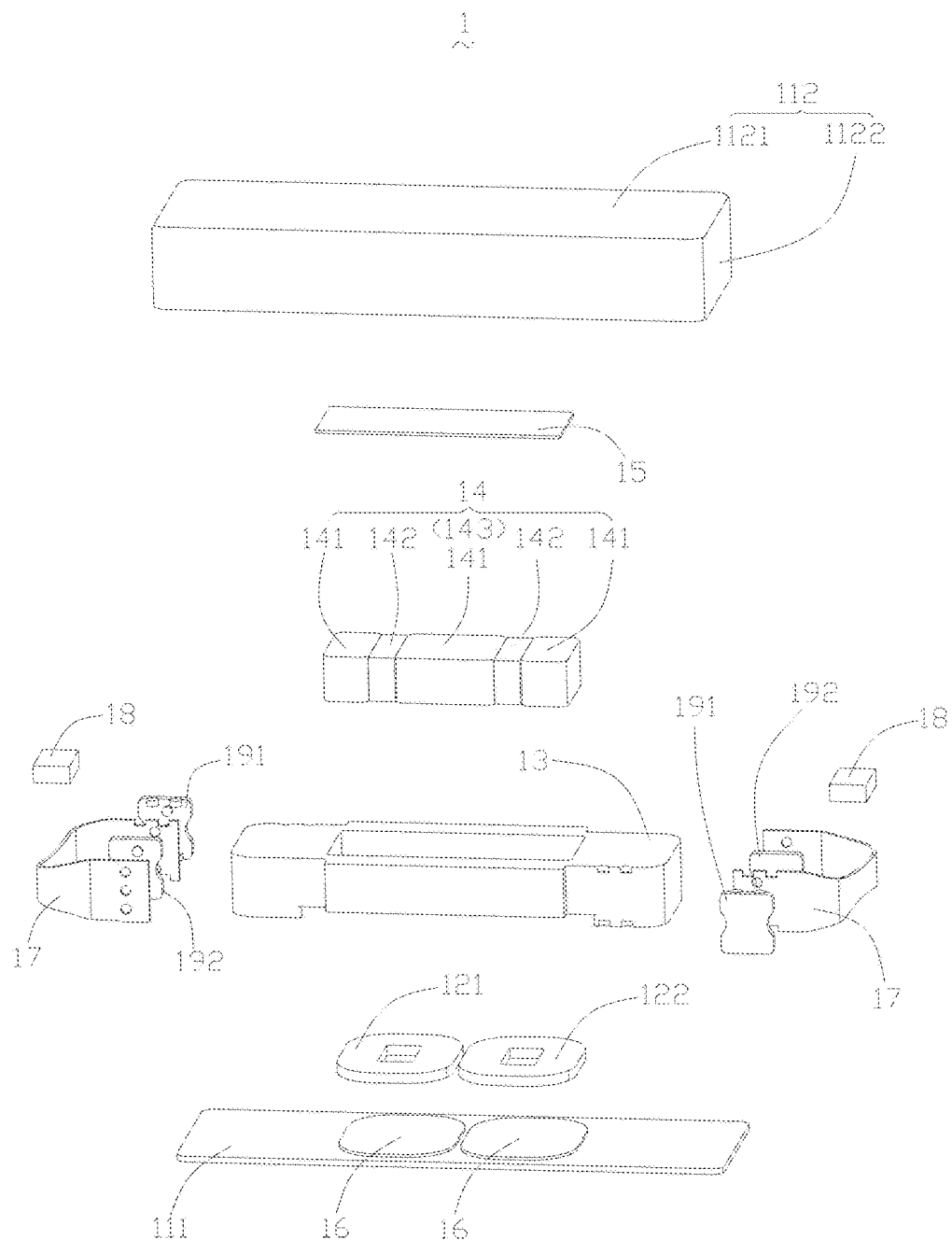
FIG. 2 is an isometric and exploded view of the linear vibrator in FIG. 1.
Figure 3:
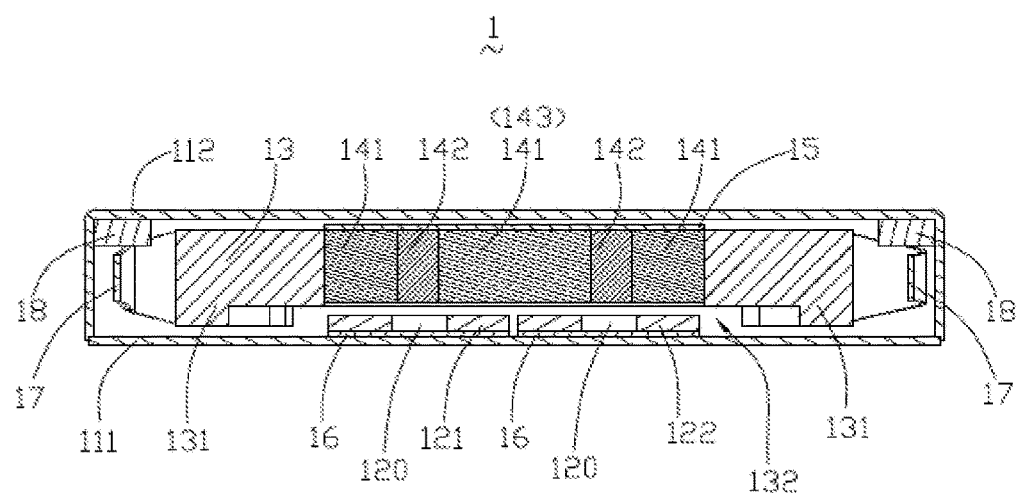
FIG. 3 is a cross-sectional view of the linear vibrator in FIG. 1.

Please refer to FIGS. 1, 2 and 3. FIG. 1 is an isometric view of a linear vibrator in accordance with an exemplary embodiment disclosed by the present disclosure. FIG. 2 is an isometric and exploded view of the linear vibrator in FIG. 1. FIG. 3 is a cross-sectional view of the linear vibrator in FIG. 1. The linear vibrator 1 comprises a housing body (not labeled), a voice coil 12, a mass block 13 with a receiving space, a magnet array 14, a first soft magnetic plate 15, a second soft magnetic plate 16, a pair of elastic elements 17, a pair of limiting stoppers 18 and a connector 19.

The housing body includes a bottom plate 111 and a housing 112. The housing 112 includes a top plate 1121 and side plate 1122 engaging with the top plate 1121. The housing 112 and the bottom plate 111 are enclosed to form a cavity. The voice coil 12, the mass block 13 which has the receiving space, the magnet array 14, the first soft magnetic plate 15, the second soft magnetic plate 16, the elastic elements 17, the limiting stoppers 18 and the connector 19 are placed in the cavity. The housing body is made of non-magnetic material, maybe metal, plastic or other high strength material or composite material. The housing body mainly protects the internal components inside the housing body and fixes the positions of the internal components.

The voice coil 12 comprises a first voice coil 121 and a second voice coil 122. The first voice coil 121 and the second voice coil 122 are spaced apart from each other, and both are positioned by the second soft magnetic plate 16 and the bottom plate 111. Specifically, the second soft magnetic plate 16 is placed on the bottom plate 111. The first voice coil 121 and the second voice coil 122 are fixed on the second soft magnetic plate 16. The second soft magnetic plate 16 can increase the attractive force between the first voice coil 121 and the second voice coil 122 and the magnets 14. Certainly, in some cases, the first voice coil 121 and the second voice coil 122 can also be fixed directly on the bottom plate 111. If the second soft magnetic plate 16 is not installed, the attractive force between the voice coil 121 and the second voice coil 122 and the magnets 14 is decreased. Such a case can prevent the vibrating area is shifted in a direction perpendicular to its vibration direction by the attractive force between them, and avoid the occurrence of the vibration instability.

The mass block 13 is located above the first voice coil 121 and the second voice coil 122. Each end of the mass block 13 is provided with a bump 131 at a side close to the bottom plate 111. A gap is formed between two bumps, so an accommodating space 132 is formed between the mass block 13 and the bottom plate 111. The first voice coil 121 and the second voice coil 122 are placed in the accommodating space 132.

Figure 4:
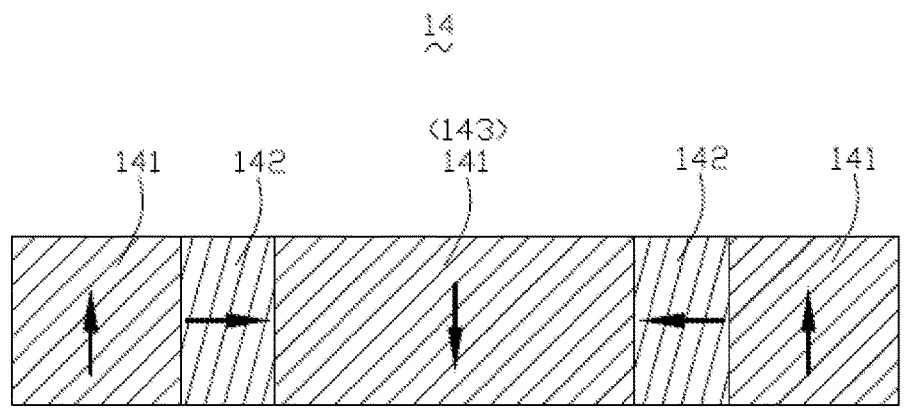
FIG. 4 is an illustration of magnets used in the linear vibrator, showing the direction of magnetization of the magnets.

The magnet array 14 is placed in the receiving space of the mass block 13. The magnet array 14 comprises odd number of longitudinally magnetized first magnets 141 and even number of transversely magnetized second magnets 142. Optionally, the second magnets 142 are less than the first magnets 141 by one piece of magnet. The first magnets 141 and the second magnets 142 are arranged alternately in a row. The adjacent first magnets 141 are in opposite magnetization directions and the adjacent second magnets 142 are also in opposite magnetization directions. In this embodiment, 3 longitudinally magnetized first magnets 141 and 2 transversely magnetized second magnets 142 are taken as one embodiment to be described in detail. Refer to FIG. 4. the first magnet 141 at the center of the magnet array 14 are the main magnet 143. The magnetization direction of the main magnet 143 is perpendicular to a plane where the voice coil 12 is located. The magnetization directions of two adjacent second magnets 142 located on both sides of the main magnet 143 are face to face. The magnetization directions of the first magnets 141 located adjacent to the second magnets 142 are opposite to the magnetization directions of the main magnet 143. Certainly, the magnet array 14 may be one piece of magnet in which the longitudinal magnetization and transverse magnetization are set alternatively. The magnetization directions of the longitudinal magnetization and transverse magnetization of 2 adjacent magnets are in opposite. The magnet array 14 is made of NbFeB permanent magnets, or other high magnetic residual material and high BH product material.

The first soft magnetic plate 15 is stacked on the magnet array 14. The first soft magnetic plate 15 can gather the magnetic field lines and form magnetic circuits. On the one hand, such configuration can increase the number of magnetic lines passing through the voice coil 12. On the other hand, the configuration can reduce magnetic flux leakage around the magnet array 14.

A pair of elastic elements 17 is located respectively on both ends of the mass block 13. The elastic element 17 is a U shaped structure. The ends of the mass block 13 are seized into the U-shaped structure of the elastic element 17. The elastic element 17 can guide the vibration of the mass block 13 and provide a restoring force for the mass block 13, so that the linear vibrator can be at a balanced position when not working.

A pair of limiting stopper 18 is symmetrically disposed at a joint between the top plate 1121 and the side plate 1122. Specifically, the limiting stoppers 18 are located between the mass block 13 and the side plate 1122, and located above the elastic elements 17. The limiting stopper 18 may prevent excessive displacement (amplitude) of the mass block 13, and further prevents the mass block 13 touching the housing 112. The limiting stopper 18 is mainly made of foam, rubber or other material which may be prepared to provide damping and elasticity.

The connector 19 includes a first connector 191 and a second connector 192. The first connector 191 is connected with one end of the elastic element 17 and the housing 112. The second connector 192 is connected with another end of the elastic element 17 and the mass block 13.

In addition, the first voice coil 121 and the second voice coil 122 are same in size and shape. They are in an annular structure and have a through hole 120. In the vertical direction, the projection the second magnet 142 on both sides of the main magnets 143 are overlapped respectively in the through hole 120 of the first voice coil 121 and the second voice coil 122.

After the voice coil 12 is energized, the voice coil 12 is under the Lorentz force in the magnetic field of the magnet array 14. The reaction force of the voice coil 12 enables the magnet array 14 to produce a thrust along its long axis. The mass block 13 and the first soft magnetic plate 15 are vibrated at the same time. Since the longitudinal magnetization of the first magnet 141 and the transverse magnetization of the second magnet 142 of the magnets 14 are arranged alternately, the magnetic fields on both sides of the magnet array 14 are distributed unevenly. The magnetic field at the side close to the voice coil 12 is increased and the magnetic field of the side far from the voice coil 12 is reduced, as a result, the magnetic field strength at the side close to the voice coil 12 is stronger than the magnetic field strength at the side far from the voice coil 12, thereby increasing the utilization ratio of the magnetic field by the voice coil 12. The increased magnetic field strength of the magnets 14 at the side close to the voice coil 12 can increase the driving force of the linear vibrator If the driving force keeps constant, the size of the magnets can be reduced; thereby the entire size of the linear vibrator can be further reduced, more conducive to the miniaturization of linear vibrator Furthermore, the reduced magnetic field strength of the magnet array 14 at the side far from the voice coil 12 can reduce the magnetic-flux leakage at this side.

In this embodiment, 3 longitudinally magnetized first magnets 141 and 2 transversely magnetized second magnets 142 are an optional embodiment. In practice, 5 longitudinally magnetized first magnets 141 and 4 transversely magnetized second magnets 142 can be disposed according to need. The embodiment is feasible as long as the magnets 14 have odd number of longitudinally magnetized first magnets 141 and even number of transversely magnetized second magnets 142.

In addition, the magnetic field strength of two first magnets 141 disposed symmetrically to the main magnet 143 is same. The magnetic field strength of two second magnets 142 disposed symmetrically to the main magnet 143 is also same. The number of the voice coils 12 and the number of the second magnets 142 are same.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrator including:
a bottom plate,
a voice coil array fixed on the bottom plate, the voice coil array including a plurality of voice coils,
a mass block which has a receiving space and located above the voice coil array,
a magnet array in the receiving space, the magnet array including odd number of longitudinally magnetized first magnets and even number of transversely magnetized second magnets, the first magnets and the second magnets being arranged alternately in a row, and the adjacent first magnets in opposite magnetization direction and the adjacent second magnets in opposite magnetization direction, wherein the number of the first magnets is more than the number of the second magnets by one, the number of the voice coils is same to the number of the second magnets, each voice coil has a through hole at the center thereof, the second magnets are one-to-one aligned with the through holes along a longitudinal direction, the magnetic pole of a second magnet facing an adjacent first magnet is same to the magnetic pole of the adjacent first magnet facing the voice coil array.

2. The linear vibrator as described in claim 1, wherein each end of the mass block is provided with a bump at a side thereof near the bottom plate for forming an accommodating space for receiving the voice coil array.

3. The linear vibrator as described in claim 1 further including a first soft magnetic plate stacked on the magnet array.

4. The linear vibrator as described in claim 3 further including a second soft magnetic plate placed on the bottom plate, and the voice coil array is fixed on the second soft magnetic plate.

5. The linear vibrator as described in claim 1 further including a pair of elastic elements located respectively on both ends of the mass block.

6. The linear vibrator as described in claim 5 further including a housing and a plurality of limiting stoppers, the housing including a top plate and a side plate disposed in contact with the top plate, and the limiting stoppers symmetrically disposed at a joint between the top plate and the side plate, wherein the housing and the bottom plate are enclosed to form a receiving space for receiving the voice coil array, the mass block and the magnet array.

7. The linear vibrator as described in claim 6 further including a first connector and a second connector, wherein the first connector is connected with one end of the elastic element and the housing, the second connector is connected with another end of the elastic element and the mass block.

* * * * *